CAMERA WITH EXPOSURE CONTROL AND FLASH APPARATUS

Original Filed May 11, 1967 3 Sheets-Sheet 1

INVENTOR.
Edwin H. Land

BY

Brown and Mikulka
and
Robert E. Corb
ATTORNEYS

CAMERA WITH EXPOSURE CONTROL AND FLASH APPARATUS

Original Filed May 11, 1967 3 Sheets-Sheet 2

INVENTOR.
Edwin H. Land

BY

Brown and Mikulka
and
Robert E. Corb
ATTORNEYS

CAMERA WITH EXPOSURE CONTROL AND FLASH APPARATUS

Original Filed May 11, 1967 3 Sheets-Sheet 3

INVENTOR.
Edwin H. Land

BY

Brown and Mikulka
and
Robert E. Corb
ATTORNEYS

United States Patent Office

Re. 27,468
Reissued Sept. 5, 1972

27,468
CAMERA WITH EXPOSURE CONTROL AND FLASH APPARATUS

Edwin H. Land, Cambridge, Mass., assignor to Polaroid Corporation, Cambridge, Mass.

Original No. 3,491,667, dated Jan. 27, 1970, Ser. No. 637,768, May 11, 1967. Application for reissue Jan. 7, 1971, Ser. No. 104,822
Int. Cl. G03b *15/04*
U.S. Cl. 95—11 L 16 Claims

Matter enclosed in heavy brackets [ ] appears in the original patent but forms no part of this reissue specification; matter printed in italics indicates the additions made by reissue.

ABSTRACT OF THE DISCLOSURE

A photographic camera having a mounting member for the objective lens which is movable along the optical axis, a linkage system including a manually engageable element for supporting the mounting member for movement relative to the camera body, a socket for receiving a photoflash device, and a cover mechanism engageable with the manual element for controlling the amount of light emitted by the photoflash device as a function of the lens-to-subject distance for which the lens is focused. The cover mechanism and manual element are mounted on the exterior of the camera body for reciprocating motion in a direction transverse to the optical axis. The camera also has a control circuit for controlling the exposure time of the camera including a photoresponsive resistor which is normally coupled to the circuit and receives light from the subject being photographed, and a second resistor which is coupled to the circuit in place of the photoresponsive resistor when a photoflash device is being used. A motion transmitting member mounted within the camera socket actuates a switch to couple either the photoresponsive resistor or the second resistor into the control circuit in response to insertion or removal of a photoflash device from the socket.

This application discloses a camera with a focusing system, an automatic shutter, means for holding a photoflash device, such as a flash cube, and altering the mode of operation of the shutter to provide exposures of a predetermined duration, and a cover member located in front of the flash device in position to block light therefrom coupled with the focusing system whereby the latter alters the position of the cover member so as to vary the amount of light blocked thereby as a function of the camera-to-subject distance for which the camera lens is focused.

The present invention is embodied in a camera incorporating an automatic shutter as is disclosed in U.S. Patent No. 3,249,034, granted to John F. Burgarella on May 3, 1966, and comprising an exposure control circuit including a photoresponsive resistor positioned for receiving light from the subject being photographed to produce exposures of a duration dependent upon the resistance of the photoresponsive resistor. The photoresponsive resistor functions to integrate the light from the entire scene and while this arrangement provides satisfactory ambient light exposures over a wide range of conditions and is capable of sensing light from the subject to control duration of the flash exposure, it has been found that less than satisfactory exposures frequently result when the subject is indoors and illuminated with flash; and that improved and more consistent results are obtainable by setting the shutter to produce an exposure of a predetermined interval long enough (e.g., 1/30 second) to take full advantage of the light output of a conventional flash lamp and controlling the light energy reaching the film by another means. According to the present invention, this other means effectively variably attenuates the light output of the flash lamp by blocking a portion of the light from the lamp as a function of the camera-to-subject distance. The camera is of the type including a member movable transverse the lens axis for focusing the lens and the light attenuating means are coupled with this movable member to mask or cover a variable portion of the flash device.

The camera of the invention illustrated by way of example includes an objective lens associated with the shutter, a camera body and an erecting and focusing system such as disclosed in U.S. Patent No. 3,185,060, issued May 26, 1965, to Robert S. Borghesani for mounting the lens and shutter on the camera body and extending and retracting the lens along its axis to focus the lens in accordance with the camera-to-subject distance. This erecting and focusing system includes a member mounted on the upper forward portion of the camera body for movement transversely of the lens axis for focusing the lens.

An object of the invention is to provide a novel and improved camera of the type described including means for mounting a photoflash device including a flash lamp and a cover for blocking a portion of the light from the flash lamp, coupled with the movable member so as to vary the amount of light blocked as a function of the distance for which the lens is focused.

Other objects of the invention are to provide a camera including means for supporting a photoflash device and responsive to insertion of the photoflash device for setting an automatic shutter to produce exposure of a predetermined duration; and to provide a camera of the type described having a simple and inexpensive construction and characterized by dependable operation.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
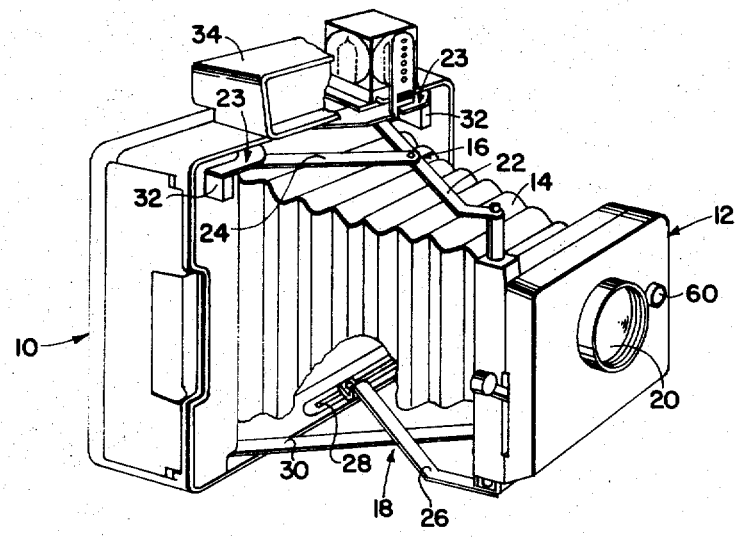
FIG. 1 is a perspective view, shown with parts broken away, of a camera embodying the invention.

While the structure of the invention may be incorporated in different types of cameras including both folding and non-folding—"box"—cameras, it is illustrated, by way of example, in FIGURE 1 of the drawings embodied in a camera of the handheld folding type. This camera includes a camera body 10, a lens and shutter assembly 12 and expandable and collapsible bellows 14 coupling the lens and shutter assembly to the camera body, and an erecting system comprising two linkages 16 and 18 for supporting the lens and shutter assembly lative to the camera body. The lens designated 20, the lens and shutter assembly 12, is fixed with re-ect to the assembly of which it is a component and cusing of the lens is achieved by moving the lens and utter assembly relative to the camera body along the is of the lens by manipulating linkages 16 and 18 hich serve to support the lens and shutter assembly. The erecting and focusing system of the camera em-dying the invention is of the type shown and described detail in the aforementioned U.S. Patent No. 3,185,-0, and accordingly linkage 16 comprises a first link pivotally connected at one end to the lens and shut-r assembly and pivotally engaged at its other end by ovable member 23 mounted on the camera body for ciprocating motion transverse the axis of lens 20; and second link 24 pivotally connected at one end to first k 22 intermediate the ends of the latter and pivotally nnected at its other end to the camera body. Linkage includes a first link 26 pivotally connected at one end the lens and shutter assembly and slidably engaged at other end in a track 28 on the camera body; and a cond link 30 pivotally connected itermediate its ends first link 26 intermediate the ends of the latter and voted at one end to the camera body and engaged at other end in a track (not shown) on the rear of the ns and shutter assembly. The construction is such that e rear ends of links 22 and 26 and the forward end link 30 may be reciprocated in generally parallel re-tion transverse the axis of lens 20 to extend and re-act the lens and shutter assembly along the lens axis r the purpose of folding and unfolding the camera and cusing the lens. To facilitate the focusing of lens 20, ovable member 23 is provided on opposite ends with ttons 32 adpated to be engaged by the index finger of e operator for reciprocating movable member 23 to cus the lens by extending and retracting the lens and utter assembly. The camera also includes a view finder preferably incorporating a range finder coupled with ovable member 23.

Figure 8:
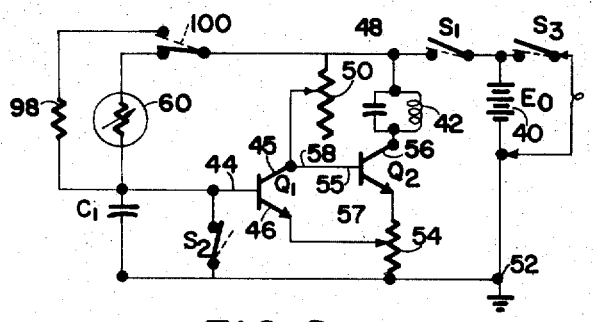
FIG. 8 is a schematic circuit diagram of a photoresponsive timing circuit adapted to use in the shutter of the camera.

As previously noted, the camera of the invention in-udes a shutter comprising a circuit for automatically ntrolling exposure duration in accordance with ambient ene brightness. This shutter mechanism, shown and de-ribed in detail in the aforementioned U.S. Patent No. 249,034 generally comprises a first blade which is ini-ally in covering position relative to an aperture through hen exposure is effected and is moved to uncover the erture to initiate exposure, and a second blade which moved after the expiration of a time period established y the control circuit to cover the aperture and terminate e exposure. The second blade is releasably retained in open position by an electromagnet and the timing nd control circuit is designed to cut off the flow of rrent to the electromagnet to free the second blade r movement to its exposure terminating position. A typi-al timing and control circuit is illustrated in FIG. 8 of e drawings as including a source of current shown the form of a battery 40 of potential $E_0$ through nor-ally open switch S1 to solenoid 42. Switch S1 is designed be moved to a closed position by movement of a con-entional shutter release member which allows movement f the first of the two shutter blades to initiate exposure. The circuit includes a voltage sensitive circuit having normally nonconductive stage that includes transistor $_1$ having base, collector and emitter electrodes 44, 45 nd 46, respectively. Collector electrode 45 of transistor $_1$ is connected to termial 48 by a variable bias resistor 0 and emitter electrode 46 of transistor $Q_1$ is connected terminal 52 by variable bias resistor 54. The normally onducting stage of the circuit includes transistor $Q_2$ aving base, collector and emitter electrodes 55, 56 and 7, respectively. Collector electrode 56 is connected to erminal 48 so that the latter is energized when transistor $_2$ conducts; base electrode 55 of transistor $Q_3$ is con-ected to collector electrode 44 of transistor $Q_1$ through lead 58 and emitter electrode 57 of transistor $Q_2$ is connected through bias resistor 54 to terminal 52. It should be noted that with this arrangement there is essentially a common emitter resistor, the adjustment or resistor 54 being for the purpose of establishing the point at which it is desired to deenergize the circuit. While the two stages of the circuit have been characterized as "normally not conducting" and "normally conducting" it should be obvious that this characterization is applicable only when power is applied to the circuit. The timing network of the circuit includes a photosensitive element 60, such as a cadmium sulfidephoto conductor, arranged to receive light from a scene being photographed and having a resistance which is functionally related to the intensity of such light. Element 60 is connected in series with an electrical impedance which, in the form shown, comprises capacitor $C_1$. Thus the timing network is connected between terminals 48 and 52 to form a conventional integrator circuit having an input at terminal 48 and an output at terminal 62, the connection between element 60 and the capacitor.

Connected between output terminal 62 of the timing network and terminal 52 is a second switch S2 which is normally in the closed position and may be opened by movement of a shutter element to initiate exposure. In the operaton of the shutter, it is preferred that switch S1 be closed first to supply current to solenoid 42 and switch S2 opened in synchronization, although not necessarily simultaneously, with initiation of exposure. Transistor $Q_2$ conducts almost instantaneously with the closing of switch S1 because at the instant of closing, the collector-base junction of transistor $Q_2$ is reverse biased causing leakage current to flow through resistor 50 establishing a forward bias on the emitting-base junction. The setting of variable resistor 50 establishes the degree to which transistor $Q_2$ conducts so that the current through solenoid 42 can be adjusted to provide magnetomotive force in the magnetic circuit to retain the shutter blade (second), which subsequently moves to terminate exposure, in its initial position. The flow of current through resistors 50 and 54, when transistor $Q_2$ conducts, establishes at collector 45 and emitter 46 of transistor $Q_1$, bias voltage having first values dependent upon the magnitudes of the respective current and resistance values.

At the instant S1 is closed, and until S2 is opened, the voltage at terminal 62 is ground potential. As previously described, the timing means act as a conventional integrating circuit so that when voltage is applied to input terminal 48 by closing switch S1, there appears at output terminal 52, upon opening of switch S2, a voltage which changes from an initial value, e.g., ground potential, to a preselected value during a period of time dependent upon the value of capacitor $C_1$ and the resistance of element 60 as established by the intensity of light incident thereon from the scene being photographed. When the voltage at terminal 62 is at its initial value and the voltages at collector 56 and emitter 67 are at their first values of bias voltage due to the conduction of transistor $Q_2$, the collector-base and emitter-base of transistor $Q_1$ are reverse biased, thus resulting in transistor $Q_1$ being cut off on nonconducting. When the voltage at output terminal 62 reaches a preselected value which forward biases the emitter-base junction of transistor $Q_1$, the latter begins to conduct.

Figure 7:
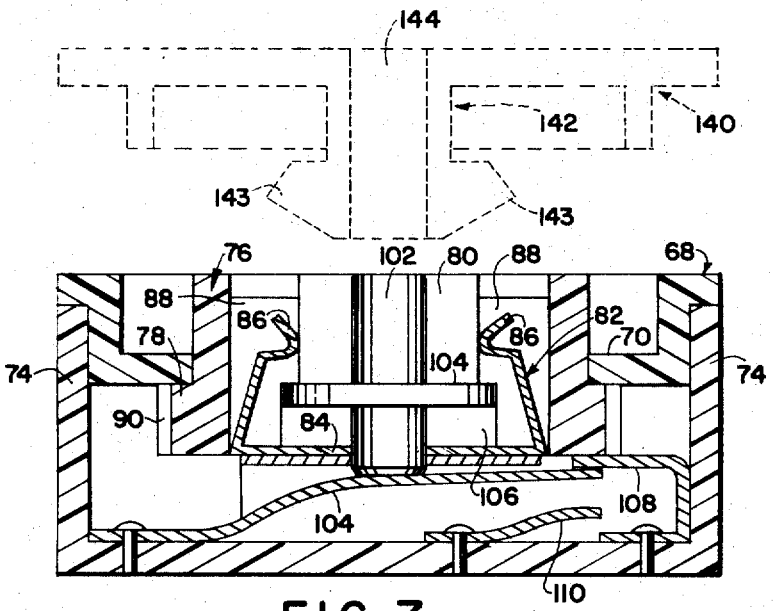
FIG. 7 is a similar view taken substantially along the line 7—7 of FIG. 6.
Figure 6:
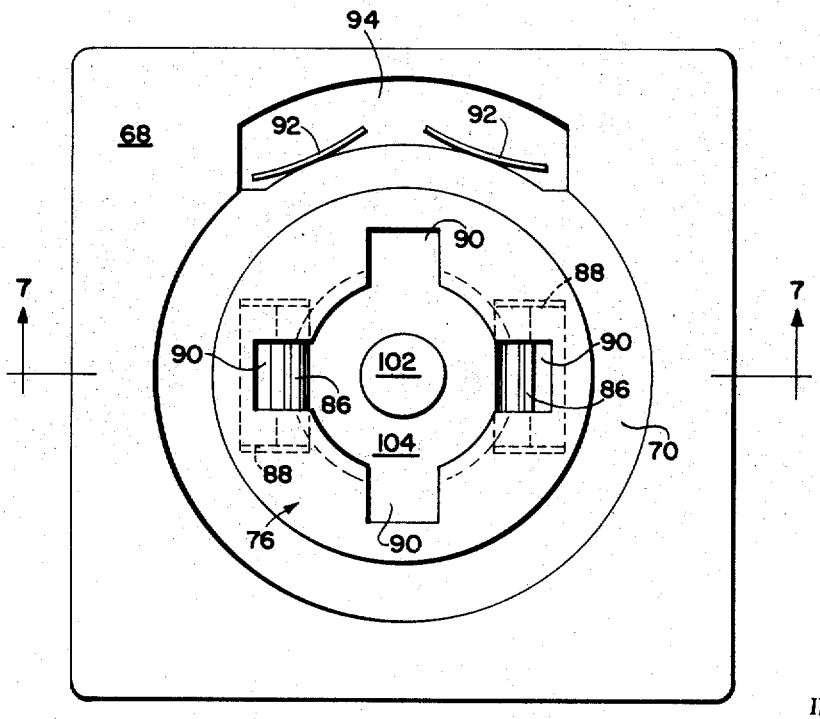
FIG. 6 is a plan view of a holder for a flash device.

In accordance with the invention, the camera includes means for mounting a conventional photoflash device on the camera in position to illuminate the subject being photographed and for making electrical connections between the photoflash device and the shutter mechanism for synchronizing operation of the flash with the operation of the shutter. In the preferred embodiment shown in FIGS. 2, 6 and 7, the flash mounting means are designed to mount a multiple flash device, such as a flash cube, described in U.S. Patent No. 3,244,087. Support means designated 66 for holding a flash cube are mounted on the upper wall of the camera body adjacent viewfinder 34 and in the form shown, comprise a housing including an upper wall 68 with a circular recessed section 70 having a centered circular opening 72, and upstanding side walls 74. Mounted within opening 72 in recessed section 70 is a support member 76 having a cylindrical periphery and engaged for rotary and axial movement in opening 72 in recessed section 70. Support member 76 extends from within support means 66 outwardly through opening 72 and includes a peripheral shoulder 78 providing a limit for the outward movement of the support member. Support member 76 includes an axial opening 80 extending therethrough and shaped to receive center portion 142 of the base 140 of a flash cube (illustrated in dotted lines in FIG. 7). Means are provided for retaining the center portion base of the flash cube within opening 80 and in the form shown comprises a detent spring 82 including a base 84 and a pair of detent arms 86 engaged in recesses 88 in the inner side of support member 76 for engaging radial projections 143 on the center portion of the flash cube base. Opening 80 includes a generally cylindrical central bore and four radical channels located 90° apart for receiving the projections 143 on the center portion of the flash cube base and for securing the flash cube against rotation relative to support member 76. The peripheral surface of the shoulder portion 78 of support member 76 located underlying recess section 70 of the upper wall 68 is provided with axial grooves 90 adapted to be engaged by detent spring (not shown) for locating and retaining the support member in each of four operative positions angularly spaced 90° from one another in order to locate the flash cube with each of its four flash lamps and reflector facing the front of the camera. A pair of electrical contacts 92 are provided extending from the inside of the support means through an opening 94 in upper wall 68 communicating with recess 88 for making contact with the electrical conductor of the flash lamp of a flash cube secured within opening 80 in support member 76. Electrical contacts 92 are connected by suitable leads to a battery and flash synchronizing switch in the shutter of the camera.

When using a photoflash device which provides a high intensity light for a relatively short duration, it is usually necessary to synchronize the actuation of the flash lamp with the operation of the camera shutter in order to effect an exposure utilizing the full output of the flash lamp. For this reason, it is common practice to provide a flash synchronizing circuit in the camera shutter for providing current to actuate the flash lamp by closing the switch in timed relation to the opening of the camera shutter to intiate exposure in synchronism with the commencement of illumination of the lamp. Such a switch may be closed by movement of the shutter blade itself and in the form shown in FIG. 8, a switch S3 is illustrated connected in series with battery 40 and a flash lamp designated 96 for supplying power to the lamp when the switch is closed; and although the circuit diagram indicates that lamp 96 receives current from battery 40, it is possible, and in fact may be desirable, to provide a separate power source for energizing the flash lamp.

The shutter of the camera of the invention is designed to respond to the intensity of light received from the scene so that proper exposures are provided automatically even when the intensity of scene illumination is changing while an exposure is being made. Thus, when the scene is illuminated by auxiliary, transient lighting means such as a conventional flash lamp with an oxidizable filament, the exposure control circuit reacts to terminate the exposure when the light energy incident on the photocell reaches a predetermined value. Photocell 60 receives light from the entire scene being photographed and functions in the nature of an integrator to exhibit a resistance which represents the average value of the scene illumination. It has been found that with certain types of scenes and under certain conditions of scene illumination, specifically when photographing subjects, such as pepole, indoors and employing flash as the course of illumination, this integrating property of the photocell may result in exposures which are not correct. Incorrect exposures may be due to a number of causes including, for example, incidence on the photocell of light from the background as well as from the subject (in the foreground) being photographed and/or light from portions of the room, such as the ceiling or from objects other than the subject, e.g., furniture and other light sources. The conventional solution to the problem of providing optimum exposures when employing artificial, transient light sources such as commercial flash lamps, is to vary the exposure parameters, that is duration and relative aperture, as a function of the camera-to-subject distance. The exposure duration may be determined by the shutter, or when a relatively short duration transient light source is employed for exposures, may be determined by the light. In this latter case, it is the usual practice to vary the relative aperture in inverse relation to the camera-to-subject distance (assuming the light source is close to the camera) in order to achieve proper exposures. Since the shutter and lens system of the invention does or may not include an aperture selectively variable to the extent required to provide proper flash exposures, this alternative is not available and in accordance with the invention, means are provided for altering the mode of operation of the exposure control circuit to provide a predetermined exposure interval and for varying the amount of light from the illumination source as a function of the camera-to-subject distance.

As previously noted the exposure control circuit of the invention is designed to automatically control the duration of exposure, whereas when a flash lamp is employed to illuminate the subject it is desirable to provide for exposures of a predetermined duration and control the effective light output of the flash lamp in order to achieve the desired exposure. Accordingly, means are provided for switching the exposure control circuit from an automatic mode to making exposures of a predetermined duration. These means comprise a resistor 98 connected in parallel with photoresponsive resistor 60 between terminals 62 and 48 and a single-throw, double-pole switch 100 for selectively connecting either photocell 60 or resistor 98 in circuit between terminals 62 and 48. As previously noted, the exposure duration is a function of the resistance of photocell 60 and will be a function of the resistors of resistor 98 when the latter is connected in circuit in place of the photocell. It is apparent, therefore, that the position of switch 100 determines the mode of operation of the exposure timing circuit and that resistor 98 can be selected to provide an exposure of any predetermined duration, such as, for example, $1/30$ second, which is at least as long as the duration of most conventional oxidizable flash lamps.

The support means for the photoflash device includes means for automatically switching the exposure control circuit to the flash mode of operation in response to introduction of the base of a flash cube into opening 80 in support member 76. These means include a pin 102 engaged for axial movement within opening 80 and an opening in base 84 of detent spring 82. Pin is biased outwardly by a cantilever spring 104 mounted within support means 66 in engagement with the inner end of pin 102 and the latter includes a flange 104 located intermediate its ends and slidably engaged in an enlarged bore 106 in support member 76 for limiting the upward or outward motion of pin 102 under the bias of spring 104. Pin 102 is designed to extend into an opening 144 in the center portion of the base of a flash cube and to be depressed inwardly against the bias of spring 104 by engagement between the center portion of the flash cube base and shoulder 104 when the center portion is inserted into opening 80 in support member 76. Spring 104 constitutes the movable contact of switch 100 which includes a fixed contact 108 normally located in engagement with spring 04 for coupling photocell 60 in the exposure timing rcuit. A spring element 110 is provided underlying the ee end section of spring 104 in position to engage spring 04 when the latter is deflected by pin 102 and constitites the other fixed contact of switch 100 for connecting sistor 98 in the exposure timing circuit when the base f the flash cube is engaged in opening 80.

Figure 2:
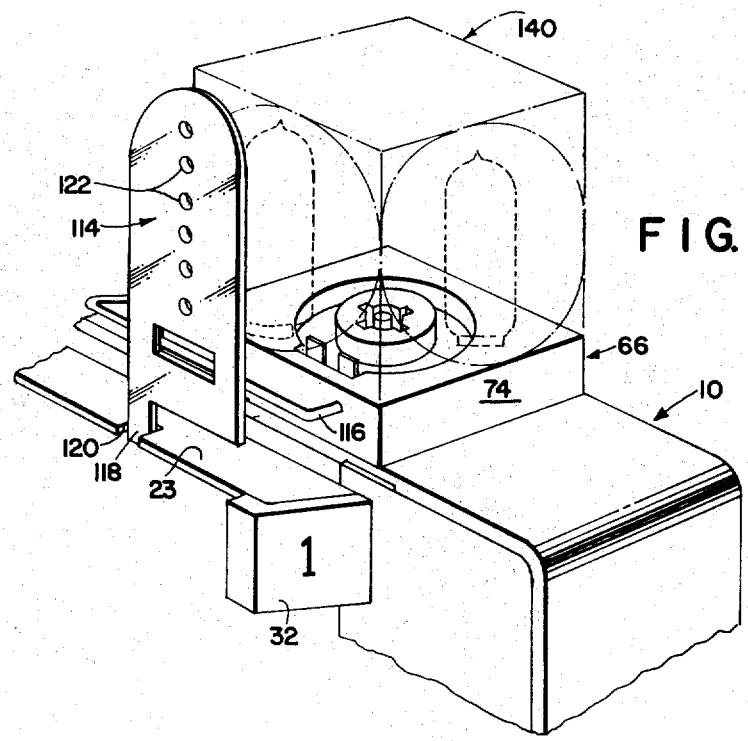
FIG. 2 is a fragmentary perspective view of the camera of FIGURE 1.
Figure 3:
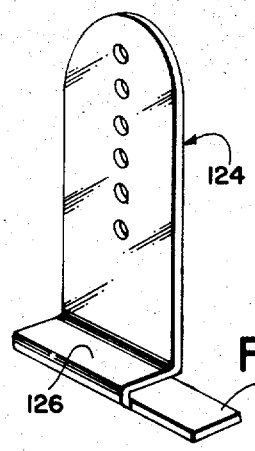
FIG. 3 is a perspective view of another embodiment of a component of the camera.

The camera includes means for automatically varying e quantity of light reaching the subject from a flash mp mounted in support means 66 in inverse relation the camera-to-subject distance for which the lens is cused. These means generally comprise a device located tween the flash lamp and the subject for attenuating, blocking, a portion of the light from the flash lamp d coupled with movable member 23 to provide for ovement of the light attenuating means relative to the ash lamp in a direction transverse the axis of lens 20 r varying the area of the flash lamp and reflector obured or masked thereby. Reference is made to FIG. 2 the drawings wherein the light-attenuating means are own as an opaque, sheet-like member 114 mounted on bar 116 so as to extend upwardly in front of a flash be 140 mounted in support means 66 in position to lock light from the flash cube and prevent the light from aching the subject. Light-blocking member 114 includes extension 118 on its lower edge engaged in a notch 20 in movable member 23 and is slidably mounted on r 116 for movement relative to support means 66 in sponse to movement of movable member 23.

Movable member 23 may be reciprocated through a mited distance for varying the focus of the camera lens er a range of camera-to-subject distances, e.g., 3½ feet infinity, and is reciprocated (to the right viewing FIG. ) to focus the lens for the shortest possible camera-tobject distance. Light-blocking member 114 is designed d coupled with movable member 23 so as to provide r maximum light attenuation, i.e., block the maximum uantity of light, when the lens is focused for the shortest mera-to-subject distance, and in the form shown in IG. 2, is symmetrical about a center line in alignment ith the center line of a flash lamp at the maximum lightlocking position. Light-blocking member 114 preferably s a width greater than the width of the flash lamp and fficient to obscure or mask a portion of the reflector opposite sides of the flash lamp, and includes a pluality of openings 122 midway between the sides for assing light directly from a flash lamp to the subject in e maximum light-blocking position of the light-blocking ember. Member 114 is also pivotable about bar 116 om the operative position shown in FIG. 2 to a storage sition closely adjacent the upper portion of support eans 66 to facilitate storage of the camera and prevent amage to member 114.

The light-blocking member may comprise a compoent of the camera as shown in FIG. 2 or an accessory dapted to be employed with the camera, as shown in IG. 3, wherein the light-blocking member, designated 24, is similar in most respects to member 114 except at it includes a lower end section 126 folded upon itself form a clip by which member 124 may be secured to ovable member 23. Section 126 includes a lateral exten-on 128 for engaging button 32 for locating member 124 ith respect to movable member 23 and support means 66.

Figure 4:
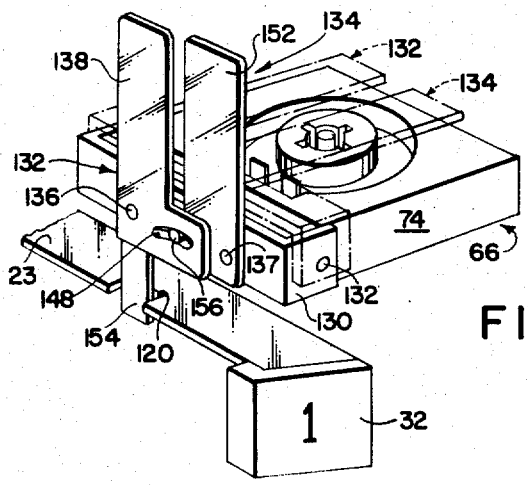
FIG. 4 is a view similar to FIG. 2 illustrating another embodiment of the invention.
Figure 5:
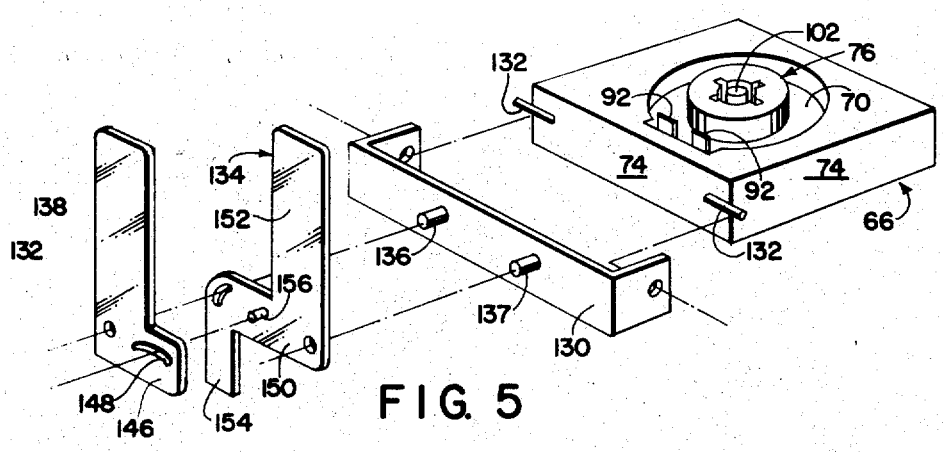
FIG. 5 is an exploded, perspective view of the structure shown in FIG. 4.

Another embodiment of the light-blocking means is lustrated in FIGS. 4 and 5 of the drawings as comrising a scissors-type device including a U-shaped base ember 130 pivotally mounted on studs 132 extending om support means 66 for movement between the opertive position shown in FIG. 4 and a storage position own in broken lines in the same figure; and a pair of ght-blocking members designated 132 and 134 pivotally ounted on studs 136 and 137, respectively, on base ember 130. Member 132 is generally L-shaped and inludes an upstanding arm 138 for obscuring a portion of e flash lamp and a horizontal arm 146 having a slot 48 and pivotally mounted on stud 136 near the juncture of arms 138 and 146. Light-blocking member 134 includes a base member 150 and arm 152 extending upwardly from one end of base 150 parallel with arm 138 and a second arm 154 extending downwardly from the opposite end of base 150 into engagement with notch 120 in movable member 23. Member 134 is pivotally mounted on stud 137 near the intersection of arms 150 and 152 and includes a stud extending from the medial portion of base 150 into engagement with slot 148 in arm 146 of member 132. Arms 138 and 152, in the maximum light attenuating position, extend upwardly in parallel relation to obscure a large portion of the flash lamp and reflector and cooperate to define therebetween a narrow vertical slot for transmitting light directly from the flash lamp to the subject. When movable member 23 is moved (to the left viewing FIG. 4) from the position shown, arm 152 is pivoted in a clockwise direction causing stud 156 to be moved upwardly in engagement with slot 148, pivoting arm 138 in a counterclockwise direction thereby unblocking a larger portion of the flash lamp and reflector to allow a greater amount of light to be transmitted from the flash lamp to the subject.

Thus the present invention provides a simple and inexpensive structure enabling the production of high quality photographs indoors with flash illumination employing a camera including a lens adapted to be focused for various camera-to-subject distances by moving a member transverse the lens axis. With this construction, the simple act of focusing a lens is automatically effective to control the illumination of the subject in accordance with the camera-to-subject distance. The apparatus of the invention also provides for converting an automatic exposure control system (shutter) from a automatic mode in which it controls exposure duration, to a flash mode, in which exposures are of a predetermined duration, simply by introducing a photoflash device, such as a flash cube, into supporting engagement with means on the camera for holding the flash device.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A folding camera including a camera body, an objective lens and mounting means for said lens movable relative to said body along the axis of said lens for focusing said lens, said camera comprising, in combination:

an erecting system coupling said mounting means with said body including a manually engageable member mounted on the exterior of said camera body for reciprocating motion in a direction transverse the axis of said lens and supporting said mounting means for movement relative to said camera body along the axis of said lens;

support means mounted on said camera body for holding a photoflash device including a source of illumination in position to direct light toward the subject being photographed; and cover means including a cover member movably mounted on said camera body in front of the illumination means of a photoflash device held by said support means in position to block a portion of the light from said illumination means;

said cover member being mounted for movement in a plane in the same direction transverse the axis of said lens as said manually engageable member and being engaged with said manually engageable member for movement thereby in said plane relative to said support means to vary the amount of light blocked by said cover member as a function of the lens-to-subject distance for which said lens is focused by movement of said manually engageable member.

2. A camera as defined in claim 1 wherein said cover member is mounted for reciprocating motion in said plane transverse said axis of said lens and is engaged with said manually engageable member so as to block the maximum amount of light when said manually engageable member is at the limit of its travel at which said camera lens is focused for the closest possible subject.

3. A camera as defined in claim 2 wherein said support means are constructed to hold a photoflash device including a reflector located behind illumination means and said cover means are constructed to block light emanating from the medial portion of said illumination means and reflector when said movable member is at said limit of its travel.

4. A camera as defined in claim 3 wherein said cover means include means defining a medial opening for transmitting light directly from said illumination means.

5. A camera as defined in claim 2 wherein said cover member is mounted for pivotable motion about an axis substantially parallel with the direction of movement of said manually engageable member, between an operative position in which said cover member extends transverse said axis beyond said support means and a storage position in which said cover member is disposed in a plane generally perpendicular to the first mentioned plane adjacent said support means.

6. A camera as defined in claim 1 wherein said cover means comprise at least two cover members movable in said plane in a direction transverse the axis of said lens relative to one another and the illumination means of a photoflash device held by said support means in response to reciprocating motion of said manually engageable member.

7. A camera as defined in claim 6 wherein said cover members cooperate to define an opening between said cover members located in front of said illumination means and are movable relative to one another to vary the size of said opening in inverse relation to the distance for which said lens is focused.

8. A camera including an objective lens, focusing means for focusing said lens and a shutter including a control circuit for producing exposures of a duration dependent upon the resistance of a photoresponsive resistor normally coupled in said control circuit and positioned to receive light from a subject being photographed, in combination therewith:

mounting means including a socket for receiving the base portion of a photoflash device including a flash lamp and making electrical connection between said flash lamp and said shutter;

a second resistor adapted, when coupled in said control circuit in place of said photoresponsive resistor, to produce an exposure of predetermined duration;

said mounting means further including a switch and a movable member mounted within said socket for actuating said switch to uncouple said photoresponsive resistor from said control circuit and couple said second resistor into said control circuit in response to engagement of said movable member by said base portion during insertion thereof into said socket; and cover means engaged with said focusing means for blocking a portion of the light from a flash lamp supported by said mounting means, said cover means being movable by said focusing means to vary the amount of light blocked by said cover means as a function of the lens-to-subject distance for which said lens is focused.

9. A camera including an objective lens, focusing means for focusing said lens and a shutter including a control circuit for producing exposures of a duration dependent upon the resistance of a photoresponsive resistor normally coupled in said control circuit and positioned to receive light from a subject being photographed, in combination therewith:

mounting means including a rotatable socket for receiving a base portion of a photoflash device comprising a plurality of flash lamps and making electrical connection between one of said flash lamp and said shutter;

a second resistor adapted, when coupled in said control circuit in place of said photoresponsive resistor, to produce an exposure of predetermined duration;

said mounting means further including a switch and a movable member mounted within said socket for actuating said switch to uncouple said photoresponsive resistor from said control circuit and couple said second resistor into said control circuit in response to engagement of said movable member by said base portion during insertion thereof into said socket and cover means engaged with said focusing means for blocking a portion of the light from a flash lamp supported by said mounting means, said cover means being movable by said focusing means to vary the amount of light blocked by said cover means as a function of the lens-to-subject distance for which said lens is focused.

*10. Photoflash modulation apparatus for use with a camera having focus adjusting means, incuuding:*

*a support;*

*receiving means connected to said support for securing a lamp to illuminate a subject;*

*light blocking means disposed outward of said receiving means and having a storage position;*

*means for erecting said light blocking means from said storage position to a position along the path of the illumination reaching said subject; and*

*distance setting means actuable in accordance with the camera-to-subject distance for moving said light blocking means transversely of the path of said illumination thereby selectively blocking portions of said illumination.*

*11. The invention according to claim 10, wherein said light blocking means includes plural light blocking members each movable transversely of the path of said illumination and mutually cooperable to define a window of a size variable as a function of camera-to-subject distance.*

*12. Photoflash modulation apparatus for use with a camera having focus adjusting means, including:*

*a support;*

*receiving means connected to said support for securing a lamp to illuminate a subject;*

*foldaway light blocking means disposed outward of said receiving means so as to define a window; and*

*distance setting means actuable in accordance with the camera-to-subject distance for moving said light blocking means transversely of the path of said illumination, thereby selectively blocking portions of said illumination and varying the size of said window.*

*13. The invention as recited in claim 12, wherein said light blocking means defines an opaque area of variable size.*

*14. The invention as delineated in claim 13, wherein said light blocking means comprises plural light blocking leaves cooperable to vary the size of said window as a function of the relative positions of said leaves.*

*15. Photoflash apparatus for use with a camera, including:*

*a support;*

*means connected to said support for securing lamp means to illuminate a subject;*

*plural light blocking means disposed outward of said securing means and having a storage position outside of the path of the illumination directed toward said subject;*

*means for erecting said plural light blocking means from said storage position to a position to define a generally planar window transverse to the path of said illumination; and*

*means for moving at least one of said plural light blocking means with respect to the other light blocking means to vary the size of said window as a function of the range of said subject.*

*16. Photoflash modulation apparatus for use with a camera having focus adjusting means, including:*

*a support;*

*receiving means connected to said support for securing a lamp to illuminate a subject;*

*light blocking means disposed outward of said receiving means and having a storage position outside of the path of the illumination directed toward said subject;*

*means for moving said light blocking means from said storage position to a position along the path of the illumination reaching said subject; and*

*distance setting means actuable in accordance with the camera-to-subject distance for moving said light blocking means transversely of the path of said illumination, thereby selectively blocking portions of said illumination.*

References Cited

The following references, cited by the Examiner, are of record in the patented file of this patent or the original patent.

UNITED STATES PATENTS

| | | | |
|---|---|---|---|
| 3,296,947 | 1/1967 | Engelsmann et al. | 95—11.5 R X |
| 3,456,101 | 7/1969 | Rentschler et al. | 95—11 R X |
| 2,811,907 | 11/1957 | Hyzer | 95—11.5 R |
| 2,879,377 | 3/1959 | Layng | 240—1.3 |
| 3,111,274 | 11/1963 | Turano | 95—11.5 R X |
| 3,326,103 | 6/1967 | Topaz | 95—11.5 R X |
| 3,386,360 | 6/1968 | Nerwin | 95—11 R |
| 3,353,467 | 11/1967 | Ernisse et al. | 95—11.5 R |

SAMUEL S. MATTHEWS, Primary Examiner

F. L. BRAUN, Assistant Examiner

U.S. Cl. X.R.

95—10 CT, 45; 240—1.3, 46.03